UNITED STATES PATENT OFFICE.

LOUIS F. ROBERTSON, OF NEW YORK, N. Y.

IMPROVED COMPOUND TO INCREASE THE FRICTION BETWEEN BELTS AND PULLEYS.

Specification forming part of Letters Patent No. 104,356, dated June 14, 1870.

*To all whom it may concern:*

Be it known that I, LOUIS F. ROBERTSON, of the city, county, and State of New York, have invented a new and Improved Friction Compound for Belts; and I do hereby declare the following to be a full, clear, and exact description thereof, which will enable those skilled in the art to make and use the same.

This invention relates to a compound which is intended to be applied to pulleys for the purpose of increasing the adhesion of the belts to the same, and which is made of a solution of india-rubber in benzine or other solvent, which solution I term "volcan-oil," and to which is added bees-wax, rosin, or other resinous material, rape-seed oil, and Venice turpentine.

These ingredients are mixed together as follows: I take volcan-oil, twenty parts; bees-wax, twenty parts; rosin or resinous substances, ten parts; rape-seed oil, twenty parts, and heat them together over a slow fire until the mass is thoroughly mixed. I then add Venice turpentine, thirty parts, and stir the mixture well until it becomes a homogeneous mass. I then allow it to cool, when it is ready for use.

This compound is applied to the faces of pulleys over which a belt runs, and its action (the adhesion of the belt to its pulley) is materially increased. The belt can, therefore, be run with a decreased tension without slipping, and by the decrease in the tension of the belt the friction in the bearing of the shaft is diminished, and an increase of power is effected. The quantity of lubricating material used for oiling the shafts is reduced, and, even if the pulleys over which a belt runs are not in the proper relative position toward each other, or if the face of a pulley is not correct, the belt will be enabled to run thereon without coming off.

The application of my compound to the faces of the pulleys must be repeated at intervals of from two to four weeks, or oftener, if necessary.

What I claim as new, and desire to secure by Letters Patent, is—

A compound intended to increase the adhesion of belts to pulleys, and made of the ingredients herein specified, and mixed together substantially in the manner and about in the proportion set forth.

This specification signed by me this 16th day of April, 1870.

L. F. ROBERTSON.

Witnesses:
W. HAUFF,
E. F. KASTENHUBER.